(No Model.) 2 Sheets—Sheet 1.
H. F. LEARNARD.
ORE CONCENTRATOR.
No. 366,631. Patented July 12, 1887.
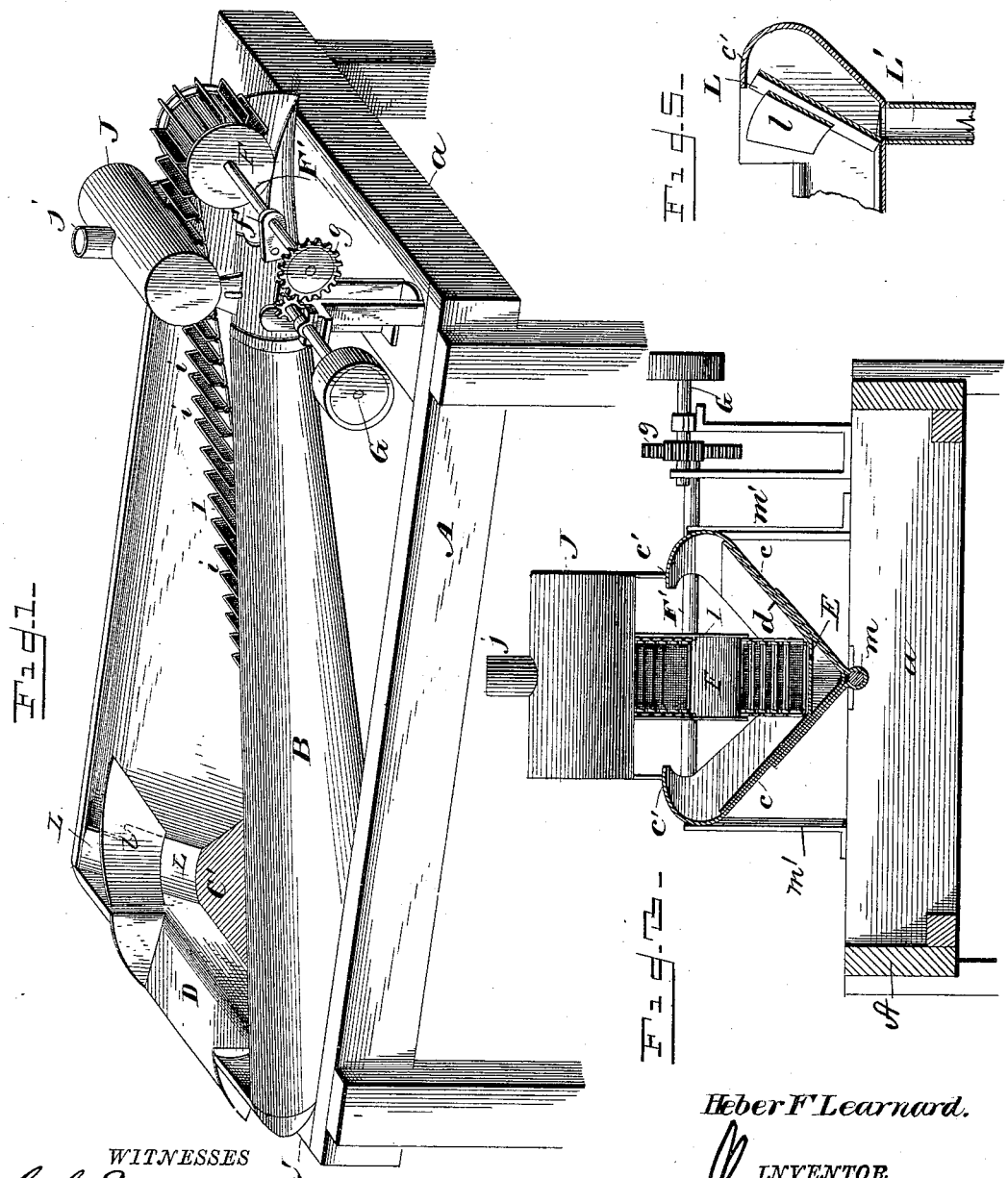
WITNESSES
G. S. Elliott
T. M. Johnson
Heber F. Learnard.
INVENTOR
Attorney (No Model.) 2 Sheets—Sheet 2.
H. F. LEARNARD.
ORE CONCENTRATOR.
No. 366,631. Patented July 12, 1887.
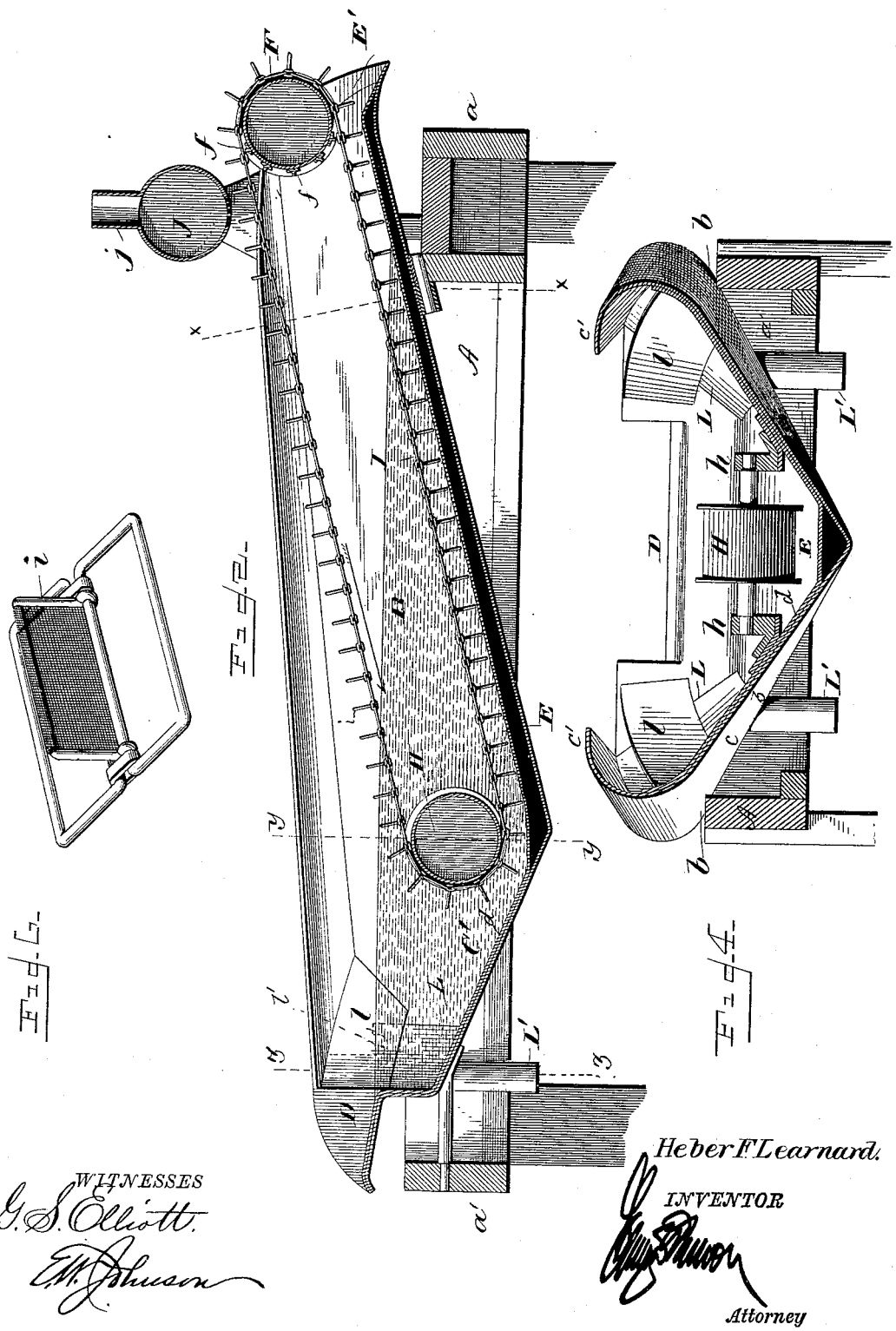
WITNESSES
G. S. Elliott
E. M. Johnson
Heber F. Learnard,
INVENTOR
Attorney

UNITED STATES PATENT OFFICE.

HEBER F. LEARNARD, OF FORT COLLINS, COLORADO, ASSIGNOR OF ONE-THIRD TO PERRY B. LEARNARD, OF SAME PLACE.

ORE-CONCENTRATOR.

SPECIFICATION forming part of Letters Patent No. 366,631, dated July 12, 1887.

Application filed July 22, 1886. Serial No. 208,753. (No model.)

*To all whom it may concern:*

Be it known that I, HEBER F. LEARNARD, a citizen of the United States of America, residing at Fort Collins, in the county of Larimer and State of Colorado, have invented certain new and useful Improvements in Ore-Concentrators; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in ore-concentrators, the object thereof being to provide a device for separating metallic ores from the gangue after pulverization, said device being adapted to be used for what is termed, technically, a "wet process;" and my invention consists in the construction and combination of the parts, as will be hereinafter fully set forth, and specifically pointed out in the claims.

In the accompanying drawings, which illustrate my invention, Figure 1 is a perspective view of my improved ore-concentrator. Fig. 2 is a longitudinal sectional view of the same. Fig. 3 is a vertical sectional view taken through the line $xx$ of Fig. 2. Fig. 4 is a sectional view through the line $yy$ of Fig. 2. Fig. 5 is a broken detail sectional view through the line $zz$ of Fig. 2; and Fig. 6 is a detail perspective view of one of the carriers detached.

A refers to a suitable horizontal frame, which is mounted on supports, the ends of said frame having cross-pieces $a$ and $a'$ rigidly attached thereto, which serve as a support for the trough or pan and the operating mechanism. The trough or pan B is provided with sides $b$, which converge toward the bottom, and also toward the upper end of the pan. The outer walls, $cc$, of the pan are constructed of any suitable metal, and the upper edges of the sides are bent inwardly, as shown at $c'$, so as to prevent the contents of the pan splashing over the edges thereof. The pan B is provided on its interior with a lining, $d$, of copper or other suitable metal not liable to rust, which is rigidly secured to the outer walls by means of rivets or other well-known connecting means. A downwardly-inclined bottom plate, C', extends forward from the lower end of the pan to its deepest part, and above the upper end of this inclined bottom plate is arranged an inclined shelf, D, upon which slime will be deposited, and may be swept or scraped into any suitable receptacle placed beneath the discharge end of said incline.

In the lower portion of the pan, and at the center thereof, is secured a false bottom, E, the sides of which are parallel, so as to form in the bottom of the pan an inclined straight way, over which the carriers attached to the belt may travel. This false bottom may form a part of the lining $d$ of the pan, and terminates at the upper portion, E', of the pan in an outlet through which passes the ore.

At the upper portion of the pan, above the discharge-spout E', is located a flanged pulley, F, which may be provided at suitable intervals with projections or sprockets $f$ to engage the links of the chain. The shaft F', which supports this pulley, is journaled in suitable bearings, $f'$, attached to the upper end of the pan, and one end of said shaft has a cog-wheel, $g$, which meshes with the pinion which is mounted on the driving-shaft G, which is rotated by any suitable mechanism. The driving-shaft is suitably supported by an upright frame attached to the transverse beam $a$ of the main frame.

At the lower portion of the pan a pulley, H, is journaled in bearings $hh$, attached to the inner side of said pan, as shown in Fig. 4. Around the pulleys F and H passes a chain-belt, I, which has attached thereto a series of carriers, $i$, consisting of screens composed either of wire-cloth or finely-perforated plates, which stand at right angles to the links of the chain, the outer edges of said carriers moving in close proximity to the false bottom E of the pan, to carry solid material contained in the pan upward to the discharge E', but admitting of the free passage of water through them.

Above the upper portion of the pan is mounted a transverse tank, J, which is provided at its bottom with a series of perforations, through which the water, which is contained therein, may pass in a spray of greater or less fineness, said water being adapted to be fed through the perforations in said tank immediately above the chain belt. The corners of the pan, at the lower end thereof, are provided with inclined plates L, portions of which extend nearly to the upper edge of the pan. One edge or side of each of these plates L is cut away, so as to provide an opening, $l'$, at the water-line, through which the discharge will pass, and in rear of said plates the discharge-pipes $L'$ are located. In front of the plates L are located guard-plates $l$, the upper and lower ends of which terminate above and below the water-level of the pan, so that the overflow of water will be taken from a point below the surface, for a purpose to be hereinafter explained. The excess of water will be drawn from below the water-line and pass under and behind the guard-plates $l$ and then over the lower portions of the plates L and out through the discharge-spouts $L'$.

The pan B is supported upon pivotal bearings $m$, and it is held securely to the frame A by a metal strap, $m'$, which forms a convenient means for mounting said pan in a proper position. The tank J, which contains the water-supply, may be provided at its inlet-opening $j$ with a stop-cock for regulating the amount of supply of water thereto.

In Fig. 2 of the drawings I have indicated the normal water-level by a dotted line, the pan being filled to such a level before operating the device. After the pan has been filled to the proper level the ore is fed into said pan in any suitable manner and at any convenient point, and the belt is rotated in the direction of the arrow shown in Fig. 2. When the belt is rotated, it will carry the ore which settles in the lower portion of the pan upwardly over the inclined bottom to the outlet-spout $E'$, where the ore will fall in a cleansed condition. The slime and lighter particles which rise to the surface of the water, and which possess value, are saved, as they are deposited upon the incline D, as when the belt is rotated it causes a current of water toward said incline D. The carriers or scrapers $i$, which are attached to the chain belt, have preferably a double thickness of wire-cloth attached thereto, though finely-perforated copper plates may be substituted for said wire-cloths. The object of these carriers $i$ is to convey the heaviest ore from the lowest point of the pan to its highest point or outlet, where it will fall into a vat or other suitable receptacle. These carriers in passing up the inclined bottom of the pan pass through a stratum of water, which holds the pulverized rock in suspension, and the cleaning or washing process goes on from the bottom to the top of the pan. The spray or jets of water which are supplied through the tank J serve two purposes—to wit, to cleanse the carriers, and also to pass through both laps of chain its full width, and to wash back what dirt might be elevated thereby. By providing the pan with a "blind discharge" all the discharges through the pipes $L'$ have to rise from below the surface and pass up and over the guards. Through the discharge-pipes $L'$ only muddy water will pass. These discharge-pipes and guards are located in the pan where there is but little agitation of the water and where there is no mineral held in suspension.

The incline D, it will be noticed, has a slight inclination toward the pan, and the upper portion of said discharge-spout is above the water-level. By this construction, when the belt is rotated, it will drive the slime toward said incline D, so that by the employment of a wide flat brush or other convenient implement the slime can be carried over the incline into a suitable receptable.

The outer walls of the pan are preferably made of heavy sheet-iron and are lined with copper, galvanized iron, or other metal which will resist oxidation.

I claim—

1. In an ore-concentrator, the combination, with a pan having an inclined bottom and converging sides, of an endless chain provided with screen-carriers for moving ore upward from the lower to the upper end of said inclined bottom, substantially as described.

2. The combination, in an ore-concentrator, with a pan having an inclined bottom plate, converging sides, and a slime-shelf, of an upwardly-inclined supplemental bottom having parallel edges, and the endless chain provided with screen-carriers arranged to move over and parallel with said supplemental bottom, substantially as described.

3. In an ore-cencentrator, a pan consisting of sides converging toward the bottom and upper end and having inturned upper edges, an upwardly-inclined bottom plate, an inclined slime-shelf, a straight supplemental bottom inclined upwardly from plate $C'$ and terminating at its upper end in a discharge-spout, discharge-pipes, plates L, secured in front of the discharge-pipes and provided each with an opening at the water-line, and guard-plates secured in front of plate L, with their upper and lower ends above and below the water-line, in combination with an endless carrier-chain adapted to produce a current in the water contained within the pan, substantially as described.

4. The combination of the pan provided with an inclined bottom terminating at one end in a discharge above the water-line and having at the other end a slime-shelf extending from below to above the water-line, the pulleys, the endless chain provided with screen-carriers arranged to move upward over the inclined bottom and parallel therewith, and the discharge-pipes designed to control the water-level, substantially as described.

5. The combination of the pan provided with an inclined bottom terminating at its upper end in a discharge and having at its other end an overflow-discharge, a guard-plate, the open ends of which terminate above and below said discharge, an inclined slime-shelf, and an endless chain mounted on pulleys and provided with carriers arranged to move upward over the inclined bottom toward the discharge, substantially as described.

6. The combination of the pan, arranged substantially as described, an endless chain moving therein and provided with carriers, and a water-tank arranged at the upper end of the pan above the belt to discharge sprays of water through both laps of the chain.

7. The combination of the pan, arranged substantially as described, pulleys H and F, an endless chain mounted on said pulleys, and the screen-carriers, each consisting of a flat blade secured to the chain at right angles to the links thereof, substantially as described.

In testimony whereof I affix my signature in presence of two witnesses.

HEBER F. LEARNARD.

Witnesses:
AVERY BEAN,
J. E. DU BOIS.